(12) United States Patent
Mahalingam et al.

(10) Patent No.: US 10,679,151 B2
(45) Date of Patent: Jun. 9, 2020

(54) UNIT-BASED LICENSING FOR THIRD PARTY ACCESS OF DIGITAL CONTENT

(71) Applicant: Altair Engineering, Inc., Troy, MI (US)

(72) Inventors: Srikanth Mahalingam, Troy, MI (US); Stephanie Scapa, Menlo Park, CA (US)

(73) Assignee: Altair Engineering, Inc., Troy, MI (US)

(*) Notice: Subject to any disclaimer, the term of this patent is extended or adjusted under 35 U.S.C. 154(b) by 398 days.

(21) Appl. No.: 14/448,001

(22) Filed: Jul. 31, 2014

(65) Prior Publication Data

US 2015/0310354 A1    Oct. 29, 2015

Related U.S. Application Data

(60) Provisional application No. 61/985,265, filed on Apr. 28, 2014.

(51) Int. Cl.
  *G06Q 20/12* (2012.01)
  *G06Q 10/00* (2012.01)

(52) U.S. Cl.
  CPC ......... *G06Q 10/00* (2013.01); *G06Q 20/1235* (2013.01); *G06Q 2220/18* (2013.01)

(58) Field of Classification Search
  CPC .......................... G06Q 10/00; G06Q 20/1235
  See application file for complete search history.

(56) References Cited

U.S. PATENT DOCUMENTS

| | | | |
|---|---|---|---|
| 4,754,426 | A | 6/1988 | Rast et al. |
| 4,937,863 | A | 6/1990 | Robert et al. |
| 5,204,897 | A | 4/1993 | Wyman |

(Continued)

FOREIGN PATENT DOCUMENTS

| | | |
|---|---|---|
| CN | 102356397 A | 2/2012 |
| EP | 1862202 A2 | 5/2007 |

(Continued)

OTHER PUBLICATIONS

Keoh, "Marlin: Toward Seamless Content Sharing and Rights Management," IEEE, all pages. (Year: 2011).*

(Continued)

*Primary Examiner* — Jacob C. Coppola
(74) *Attorney, Agent, or Firm* — Fish & Richardson P.C.

(57) ABSTRACT

A method and apparatus for unit-based licensing for third party access of digital content are provided. Unit-based licensing for third party access of digital content may include receiving a request for access to content, the request for access indicating the customer account and a third party, identifying a cardinality of assigned units for the content, identifying a cardinality of available licensing units allocated to the customer account, determining, by a processor, whether the cardinality of the assigned units is within the cardinality of available licensing units, outputting a response indicating that the request is granted on a condition that the cardinality of the assigned units is within the cardinality of available licensing units, and outputting a response indicating that the request is denied on a condition that the cardinality of the assigned units exceeds the cardinality of available licensing units.

4 Claims, 3 Drawing Sheets

(56) References Cited

U.S. PATENT DOCUMENTS

| | | |
|---|---|---|
| 5,260,999 A | 11/1993 | Wyman |
| 5,390,297 A | 2/1995 | Barber et al. |
| 5,438,508 A | 8/1995 | Wyman |
| 5,579,222 A | 11/1996 | Bains et al. |
| 5,606,493 A | 2/1997 | Duscher et al. |
| 5,634,080 A | 5/1997 | Kikinis et al. |
| 5,671,412 A | 9/1997 | Christiano |
| 5,742,813 A | 4/1998 | Kavanagh et al. |
| 5,745,879 A | 4/1998 | Wyman |
| 5,752,041 A | 5/1998 | Fosdick |
| 5,758,069 A | 5/1998 | Olsen |
| 5,758,257 A | 5/1998 | Herz et al. |
| 5,790,664 A | 8/1998 | Coley |
| 5,835,910 A | 11/1998 | Kavanagh et al. |
| 5,905,860 A | 5/1999 | Olsen |
| 5,920,861 A | 7/1999 | Hall |
| 5,931,901 A | 8/1999 | Wolfe et al. |
| 5,966,444 A | 10/1999 | Yuan et al. |
| 5,973,683 A | 10/1999 | Cragun et al. |
| 5,990,883 A | 11/1999 | Byrne et al. |
| 6,009,401 A | 12/1999 | Horstmann |
| 6,020,883 A | 2/2000 | Herz et al. |
| 6,026,387 A | 2/2000 | Kesel |
| 6,029,176 A | 2/2000 | Cannon |
| 6,038,591 A | 3/2000 | Wolfe et al. |
| 6,049,332 A | 4/2000 | Boetje et al. |
| 6,049,789 A | 4/2000 | Frison et al. |
| 6,088,722 A | 7/2000 | Herz et al. |
| 6,101,606 A | 8/2000 | Diersch |
| 6,118,492 A | 9/2000 | Milnes et al. |
| 6,133,909 A | 10/2000 | Schein et al. |
| 6,141,754 A | 10/2000 | Choy |
| 6,160,570 A | 12/2000 | Sitnik |
| 6,161,137 A | 12/2000 | Ogdon et al. |
| 6,161,142 A | 12/2000 | Wolfe et al. |
| 6,169,992 B1 | 1/2001 | Beall et al. |
| 6,173,269 B1 | 1/2001 | Solokl et al. |
| 6,182,050 B1 | 1/2001 | Ballard |
| 6,198,906 B1 | 3/2001 | Boetje et al. |
| 6,219,652 B1 | 4/2001 | Carter et al. |
| 6,240,415 B1 | 5/2001 | Blumberg |
| 6,256,664 B1 | 7/2001 | Donoho et al. |
| 6,262,721 B1 | 7/2001 | Tsukidate et al. |
| 6,263,362 B1 | 7/2001 | Donoho et al. |
| 6,263,501 B1 | 7/2001 | Schein et al. |
| 6,275,844 B1 | 8/2001 | Rail |
| 6,286,140 B1 | 9/2001 | Ivanyi |
| 6,317,881 B1 | 11/2001 | Shah-Nazaroff et al. |
| 6,324,519 B1 | 11/2001 | Eldering |
| 6,411,941 B1 | 6/2002 | Mullor et al. |
| 6,473,794 B1 | 10/2002 | Guheen et al. |
| 6,502,079 B1 | 12/2002 | Ball |
| 6,502,124 B1 | 12/2002 | Shimakawa et al. |
| 6,519,571 B1 | 2/2003 | Guheen et al. |
| 6,536,037 B1 | 3/2003 | Guheen et al. |
| 6,574,612 B1 | 6/2003 | Baratti et al. |
| 6,591,244 B2 | 7/2003 | Jim et al. |
| 6,606,744 B1 | 8/2003 | Mikurak |
| 6,615,166 B1 | 9/2003 | Guheen et al. |
| 6,671,818 B1 | 12/2003 | Mikurak |
| 6,721,713 B1 | 4/2004 | Guheen et al. |
| 6,732,106 B2 | 5/2004 | Okamoto et al. |
| 6,728,766 B2 | 8/2004 | Cox et al. |
| 6,816,882 B1 | 11/2004 | Conner et al. |
| 6,859,792 B1 | 2/2005 | Marjadi et al. |
| 6,889,206 B1 | 5/2005 | Nuttall |
| 6,948,070 B1 | 9/2005 | Ginter |
| 6,957,186 B1 | 10/2005 | Guheen et al. |
| 6,966,832 B2 | 11/2005 | Leen et al. |
| 7,013,294 B1 | 3/2006 | Sekigawa et al. |
| 7,036,091 B1 | 4/2006 | Nguyen |
| 7,124,101 B1 | 10/2006 | Mikurak |
| 7,130,807 B1 | 10/2006 | Mikurak |
| 7,139,737 B2 | 11/2006 | Takahashi et al. |
| 7,165,041 B1 | 1/2007 | Guheen et al. |
| 7,194,439 B2 | 3/2007 | Kassan et al. |
| 7,203,966 B2 | 4/2007 | Abburi et al. |
| 7,209,900 B2 | 4/2007 | Hunter et al. |
| 7,225,165 B1 | 5/2007 | Kyojima |
| 7,299,209 B2 | 11/2007 | Collier |
| 7,313,512 B1 | 12/2007 | Traut et al. |
| 7,315,826 B1 | 1/2008 | Guheen et al. |
| 7,343,365 B2 | 3/2008 | Farnham |
| 7,395,245 B2 | 7/2008 | Okamoto et al. |
| 7,590,601 B2 | 9/2009 | Shea et al. |
| 7,630,986 B1 | 12/2009 | Herz |
| 7,672,972 B1 * | 3/2010 | Marjadi ............... G06Q 30/06 705/59 |
| 7,716,077 B1 | 5/2010 | Mikurak |
| 7,788,272 B2 | 8/2010 | Ray |
| 7,809,648 B2 * | 10/2010 | Misra ................... G06Q 30/06 380/30 |
| 7,818,350 B2 | 10/2010 | New et al. |
| 7,859,551 B2 | 12/2010 | Bulman |
| 8,032,409 B1 | 10/2011 | Mikurak |
| 8,073,780 B2 * | 12/2011 | Marjadi ............... G06Q 30/06 705/52 |
| 8,126,938 B2 | 2/2012 | Cohen |
| 8,340,796 B2 | 12/2012 | Stefik |
| 8,392,505 B2 | 3/2013 | Haughay et al. |
| 8,504,932 B2 | 8/2013 | Quek et al. |
| 8,548,839 B2 | 10/2013 | Neilesh |
| 8,831,998 B1 | 9/2014 | Cramer |
| 8,943,425 B2 | 1/2015 | Wickramasurya et al. |
| 9,065,824 B1 | 6/2015 | Valdivia |
| 9,135,580 B1 | 9/2015 | Lyman |
| 9,678,637 B1 | 6/2017 | Brothers et al. |
| 9,712,587 B1 | 7/2017 | Alfishawi et al. |
| 10,120,983 B2 * | 11/2018 | Smith, II ............... G06F 21/10 |
| 10,230,673 B1 | 3/2019 | Lewis et al. |
| 2001/0010046 A1 | 7/2001 | Muyres |
| 2001/0011253 A1 | 8/2001 | Coley |
| 2001/0013024 A1 | 8/2001 | Takahashi et al. |
| 2001/0037404 A1 | 11/2001 | Hafsteinsson |
| 2002/0007298 A1 | 1/2002 | Jim et al. |
| 2002/0029347 A1 | 3/2002 | Edelman |
| 2002/0046181 A1 | 4/2002 | Story, Jr. |
| 2002/0049679 A1 | 4/2002 | Russell et al. |
| 2002/0059094 A1 | 5/2002 | Hosea et al. |
| 2002/0069263 A1 | 6/2002 | Sears et al. |
| 2002/0069420 A1 | 6/2002 | Russell |
| 2002/0091568 A1 | 7/2002 | Kraft et al. |
| 2002/0120564 A1 | 8/2002 | Strietzel |
| 2002/0129356 A1 | 9/2002 | Hellerstein et al. |
| 2002/0156824 A1 | 10/2002 | Armstrong |
| 2002/0161908 A1 | 10/2002 | Benitez |
| 2002/0183045 A1 | 12/2002 | Emmerson et al. |
| 2002/0194589 A1 | 12/2002 | Crisofalo et al. |
| 2003/0036683 A1 | 2/2003 | Kehr et al. |
| 2003/0046578 A1 | 3/2003 | Brown et al. |
| 2003/0050979 A1 | 3/2003 | Takahashi |
| 2003/0059022 A1 | 3/2003 | Nebiker et al. |
| 2003/0069766 A1 | 4/2003 | Hoffman et al. |
| 2003/0084165 A1 | 5/2003 | Kjellberg et al. |
| 2003/0135380 A1 | 7/2003 | Lehr et al. |
| 2003/0135474 A1 | 7/2003 | Circenis et al. |
| 2003/0144903 A1 | 7/2003 | Brechner |
| 2003/0149993 A1 | 8/2003 | Son |
| 2003/0182142 A1 | 9/2003 | Valenzuela et al. |
| 2003/0208763 A1 | 11/2003 | McElhatten et al. |
| 2004/0122774 A1 | 6/2004 | Studd et al. |
| 2005/0033613 A1 | 2/2005 | Patullo |
| 2005/0049931 A1 | 3/2005 | Wisnudel et al. |
| 2005/0077349 A1 | 4/2005 | Bonalle |
| 2005/0182731 A1 | 8/2005 | Marjadi et al. |
| 2006/0004668 A1 | 1/2006 | Hamnen et al. |
| 2006/0020556 A1 | 1/2006 | Hamnen et al. |
| 2006/0073820 A1 | 4/2006 | Craswell et al. |
| 2006/0106728 A1 | 5/2006 | Yellai et al. |
| 2006/0143134 A1 | 6/2006 | So et al. |
| 2006/0143236 A1 | 6/2006 | Wu |
| 2006/0153073 A1 | 7/2006 | Ghiware |
| 2006/0248017 A1 | 11/2006 | Koka et al. |
| 2006/0259930 A1 | 11/2006 | Rothschild |

(56) References Cited

U.S. PATENT DOCUMENTS

| | | |
|---|---|---|
| 2006/0287959 A1 | 12/2006 | Blecken |
| 2006/0294019 A1 | 12/2006 | Dayan et al. |
| 2007/0016599 A1 | 1/2007 | Plastina |
| 2007/0106622 A1 | 5/2007 | Boomershine et al. |
| 2007/0219923 A1 | 9/2007 | Shea et al. |
| 2007/0226150 A1 | 9/2007 | Piertrzak et al. |
| 2007/0226155 A1 | 9/2007 | Yu et al. |
| 2007/0233578 A1 | 10/2007 | Fusz et al. |
| 2007/0233837 A1 | 10/2007 | Imai |
| 2007/0244826 A1 | 10/2007 | Wang |
| 2007/0277233 A1 | 11/2007 | Bodin et al. |
| 2007/0299845 A1 | 12/2007 | Tokunago |
| 2008/0005032 A1 | 1/2008 | Znidarsic |
| 2008/0015888 A1* | 1/2008 | Dang ................ G06F 21/10 705/1.1 |
| 2008/0064493 A1 | 3/2008 | Andersson |
| 2008/0071689 A1 | 3/2008 | Tabet |
| 2008/0080552 A1 | 4/2008 | Gates et al. |
| 2008/0082450 A1 | 4/2008 | Grimm et al. |
| 2008/0083025 A1 | 4/2008 | Meijer et al. |
| 2008/0154798 A1 | 6/2008 | Valz |
| 2008/0178284 A1 | 7/2008 | Harwell |
| 2008/0208692 A1 | 8/2008 | Garaventi |
| 2008/0228533 A1 | 9/2008 | McGuire et al. |
| 2008/0228689 A1 | 9/2008 | Tewary et al. |
| 2008/0235116 A1 | 9/2008 | Jensen |
| 2008/0250349 A1 | 10/2008 | Peiro et al. |
| 2008/0288542 A1 | 11/2008 | Buttars |
| 2008/0319910 A1 | 12/2008 | Duffus et al. |
| 2009/0003712 A1 | 1/2009 | Mei et al. |
| 2009/0048860 A1 | 2/2009 | Brotman et al. |
| 2009/0094159 A1 | 4/2009 | Cunningham |
| 2009/0132435 A1 | 5/2009 | Titus et al. |
| 2009/0150343 A1 | 6/2009 | English |
| 2009/0240629 A1 | 9/2009 | Xie et al. |
| 2009/0287513 A1 | 11/2009 | Anderson |
| 2009/0319638 A1 | 12/2009 | Faith |
| 2009/0327437 A1 | 12/2009 | Estrada |
| 2010/0017725 A1 | 1/2010 | McCarthy et al. |
| 2010/0114531 A1 | 5/2010 | Korn |
| 2010/0185656 A1 | 7/2010 | Pollard |
| 2010/0186066 A1 | 7/2010 | Pollard |
| 2010/0217613 A1 | 8/2010 | Kelly |
| 2010/0223677 A1* | 9/2010 | Scapa ................ G06Q 30/06 726/30 |
| 2010/0228679 A1 | 9/2010 | Scapa |
| 2010/0251181 A1 | 9/2010 | Lal |
| 2010/0278453 A1 | 11/2010 | King |
| 2011/0047566 A1* | 2/2011 | Matuchniak .......... H04N 7/162 725/29 |
| 2011/0113133 A1 | 5/2011 | Kelly |
| 2011/0213681 A1 | 9/2011 | Shahid |
| 2011/0239131 A1 | 9/2011 | Koren |
| 2012/0022954 A1 | 1/2012 | Garcia et al. |
| 2012/0041812 A1 | 2/2012 | Postrel |
| 2012/0066089 A1 | 3/2012 | Henderson |
| 2012/0173975 A1 | 7/2012 | Herz et al. |
| 2012/0185389 A1 | 7/2012 | Ross |
| 2012/0226978 A1 | 9/2012 | Harberts et al. |
| 2012/0246734 A1 | 9/2012 | Pride et al. |
| 2012/0251080 A1 | 10/2012 | Svendsen |
| 2012/0272185 A1 | 10/2012 | Dodson |
| 2012/0272256 A1 | 10/2012 | Bedi |
| 2012/0296681 A1 | 11/2012 | Fitzgerald |
| 2012/0317198 A1 | 12/2012 | Patton |
| 2013/0042262 A1 | 2/2013 | Riethmueller |
| 2013/0054279 A1 | 2/2013 | Sharp |
| 2013/0138426 A1 | 5/2013 | DelRocco |
| 2013/0145385 A1 | 6/2013 | Aghajanyan et al. |
| 2013/0166649 A1 | 6/2013 | Atzmon |
| 2013/0179680 A1 | 7/2013 | Peterka et al. |
| 2013/0185656 A1 | 7/2013 | Heikes et al. |
| 2013/0246916 A1 | 9/2013 | Reimann et al. |
| 2013/0311768 A1 | 11/2013 | Fosmark |
| 2013/0312022 A1 | 11/2013 | Yoon |
| 2013/0332395 A1 | 12/2013 | Kim et al. |
| 2013/0339362 A1 | 12/2013 | Yang |
| 2013/0339397 A1 | 12/2013 | Herasymchuk |
| 2014/0208391 A1 | 7/2014 | Farnsworth |
| 2014/0222775 A1 | 8/2014 | Zohar et al. |
| 2014/0258029 A1 | 9/2014 | Thierry |
| 2014/0278968 A1 | 9/2014 | Strompolos |
| 2014/0280079 A1 | 9/2014 | Jain |
| 2014/0280899 A1 | 9/2014 | Brewster, Jr. |
| 2014/0372315 A1 | 12/2014 | Faith |
| 2014/0379705 A1 | 12/2014 | Zureiqat |
| 2014/0379729 A1 | 12/2014 | Savage |
| 2015/0051925 A1* | 2/2015 | Yudin ................ G06Q 10/02 705/5 |
| 2015/0074413 A1* | 3/2015 | Hao .................... H04L 63/123 713/176 |
| 2015/0088668 A1 | 3/2015 | Bruce |
| 2015/0117631 A1 | 4/2015 | Tuchman |
| 2015/0120357 A1 | 4/2015 | Tuchman |
| 2015/0193600 A1* | 7/2015 | Matsuda ............. H04L 63/0823 726/9 |
| 2015/0302321 A1 | 10/2015 | Scapa et al. |
| 2015/0310354 A1 | 10/2015 | Mahalingam et al. |
| 2015/0310513 A1 | 10/2015 | Fariello et al. |
| 2015/0346928 A1 | 12/2015 | MacArthur |
| 2015/0379118 A1 | 12/2015 | Wickenkamp |
| 2016/0057473 A1 | 2/2016 | Mitchell |
| 2016/0092780 A1 | 3/2016 | Kelley |
| 2016/0253710 A1 | 9/2016 | Publicover |
| 2016/0297398 A1 | 10/2016 | Jefferies |
| 2016/0359816 A1 | 12/2016 | Vedula et al. |
| 2017/0295119 A1 | 10/2017 | Rosenberg |
| 2017/0300456 A1 | 10/2017 | Rimmer |
| 2017/0339081 A1 | 11/2017 | Beust |
| 2018/0046944 A1 | 2/2018 | Barbera |
| 2018/0124105 A1 | 5/2018 | Rodrigues |
| 2018/0349641 A1 | 12/2018 | Barday |
| 2019/0215344 A1 | 7/2019 | Barday |
| 2019/0222476 A1 | 7/2019 | McEntee |
| 2019/0332803 A1 | 10/2019 | Barday |

FOREIGN PATENT DOCUMENTS

| | | |
|---|---|---|
| EP | 2409258 | 1/2012 |
| EP | 2414954 | 2/2012 |
| JP | 2002091595 | 3/2002 |
| JP | 2005250635 | 9/2005 |
| JP | 2007265193 | 10/2007 |
| JP | 20070286703 | 11/2007 |
| KR | 20010095908 | 11/2001 |
| KR | 101185968 | 9/2012 |
| WO | 9220021 | 11/1992 |
| WO | 2010108006 A2 | 1/2011 |
| WO | 2010115107 A3 | 1/2011 |
| WO | WO 2012048086 | 4/2012 |

OTHER PUBLICATIONS

Altair Releases HyperWorks 9.0, Connecting Engineerings with New Solver Technology and to the Global Grid: Newest version of Altair's simulation platform delivers on-demand access to the ISV applications and offers multi-core licensing business model Anonymous. PR Newswire [New York] May 19, 2008, downloaded from ProQuestDirect on the Internet 06, 3 pages.

Brignall, "Peugeot launches car club with a difference", The Guardian, Jul. 9, 2010, retrieved from: http://www.guardian.co.uk/money/2010/jul/10/peugeot-car-club-mu/print on Oct. 4, 2011.

Levine, "Share My Ride", The New York Times, Mar. 8, 2009, retrieved from: http://www.nytimes.com/2009/03/08/magazine/08Zipcar-t.html?pagewanted=print on Oct. 4, 2011.

Zipcar, "is zipcar for me", retrieved from: http://www.zipcar.com/is-it/ on Oct. 4, 2011.

Zipcar, "rates & plans", retrieved from: http://www.zipcar.com/atlanta/check-rates on Oct. 4, 2011.

Notification of Transmittal dated Dec. 27, 2012, the International Search Report and the Written Opinion of the International Search-

(56) References Cited

OTHER PUBLICATIONS ing Authority (ISA/KR) from corresponding International Application No. PCT/US2011/055060 filed Oct. 6, 2011.
Notification of Transmittal, International Preliminary Report on Patentability dated Sep. 29, 2011 from the corresponding International Patent Application No. PCT/US2010/027820 filed Mar. 18, 2010.
Notification of Transmittal, International Search Report and Written Opinion dated Oct. 26, 2010 from the corresponding International Patent Application No. PCT/US2010/027820 filed Mar. 18, 2010.
Extended European Search Report in co-pending European Application No. 10754111.2 dated Aug. 14, 2012 in 5 pages.
Notification of Transmittal, International Preliminary Report on Patentability dated Oct. 13, 2011 from the corresponding International Patent Application No. PCT/US2010/029787 filed Apr. 2, 2010.
Notification of Transmittal, International Search Report and Written Opinion dated Nov. 2, 2010 from the corresponding International Patent Application No. PCT/US2010/029787 filed Apr. 2, 2010.
EP Suppl Search Report for EP App No. 10759478.0 dated Apr. 18, 2013 (5 pages).
JP Office Action for JP 2012-503741 dated Jan. 20, 2014 (4 pages).
Final Office Action in Appln. No. 14/531,443, dated Mar. 21, 2019, 15 pages.

\* cited by examiner

UNIT-BASED LICENSING FOR THIRD PARTY ACCESS OF DIGITAL CONTENT

CROSS-REFERENCE TO RELATED APPLICATIONS

This application claims priority to U.S. Provisional Patent Application No. 61/985,265, filed on Apr. 28, 2014, which is incorporated by reference in its entirety herein.

TECHNICAL FIELD

The present disclosure relates to systems and methods of licensing access to digital content.

BACKGROUND OF THE DISCLOSURE

Digital content such as computer software products, video games, music, and any other media capable of being embodied in digital format may be sold or licensed to an end user customer. For example, the right to copy, access, or execute the digital content may be licensed to a user and a provider or vendor may retain ownership of the rights to the content. Accordingly, it may be desirable to provide unit-based licensing for third party access of digital content.

SUMMARY OF THE DISCLOSURE

Disclosed herein are aspects, features, elements, implementations, and embodiments of unit-based licensing for third party access of digital content.

In an embodiment, a method of unit-based licensing for third party access of digital content is disclosed. Unit-based licensing for third party access of digital content may include receiving a request for access to content, the request for access indicating the customer account and a third party, identifying a cardinality of assigned units for the content, identifying a cardinality of available licensing units allocated to the customer account, determining, by a processor, whether the cardinality of the assigned units is within the cardinality of available licensing units, outputting a response indicating that the request is granted on a condition that the cardinality of the assigned units is within the cardinality of available licensing units, and outputting a response indicating that the request is denied on a condition that the cardinality of the assigned units exceeds the cardinality of available licensing units.

In another embodiment, an apparatus for unit-based licensing for third party access of digital content is disclosed. The apparatus may include a non-transitory computer readable memory and a processor configured to execute instructions stored on the memory to receive a request for access to content, the request for access indicating a customer account and a third party, identify a cardinality of assigned units for the content, identify a cardinality of available licensing units allocated to the customer account, determine whether the cardinality of the assigned units is within the cardinality of the available licensing units, output a response indicating that the request is granted on a condition that the cardinality of the assigned units is within the cardinality of the available licensing units, and output a response indicating that the request is denied on a condition that the cardinality of the assigned units exceeds the cardinality of the available licensing units.

In another embodiment, a method of accessing digital content using unit-based licensing by a third party is disclosed. Accessing digital content using unit-based licensing by a third party may include transmitting, by a processor in response to instructions stored on a non-transitory computer readable medium, a request for access to content, the request for access indicating a customer account and a third party, receiving a response indicating that the request is granted on a condition that a cardinality of assigned units for the content is within a cardinality of available licensing units allocated to the customer account, and receiving a response indicating that the request is denied on a condition that the cardinality of the assigned units exceeds the cardinality of the available licensing units.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
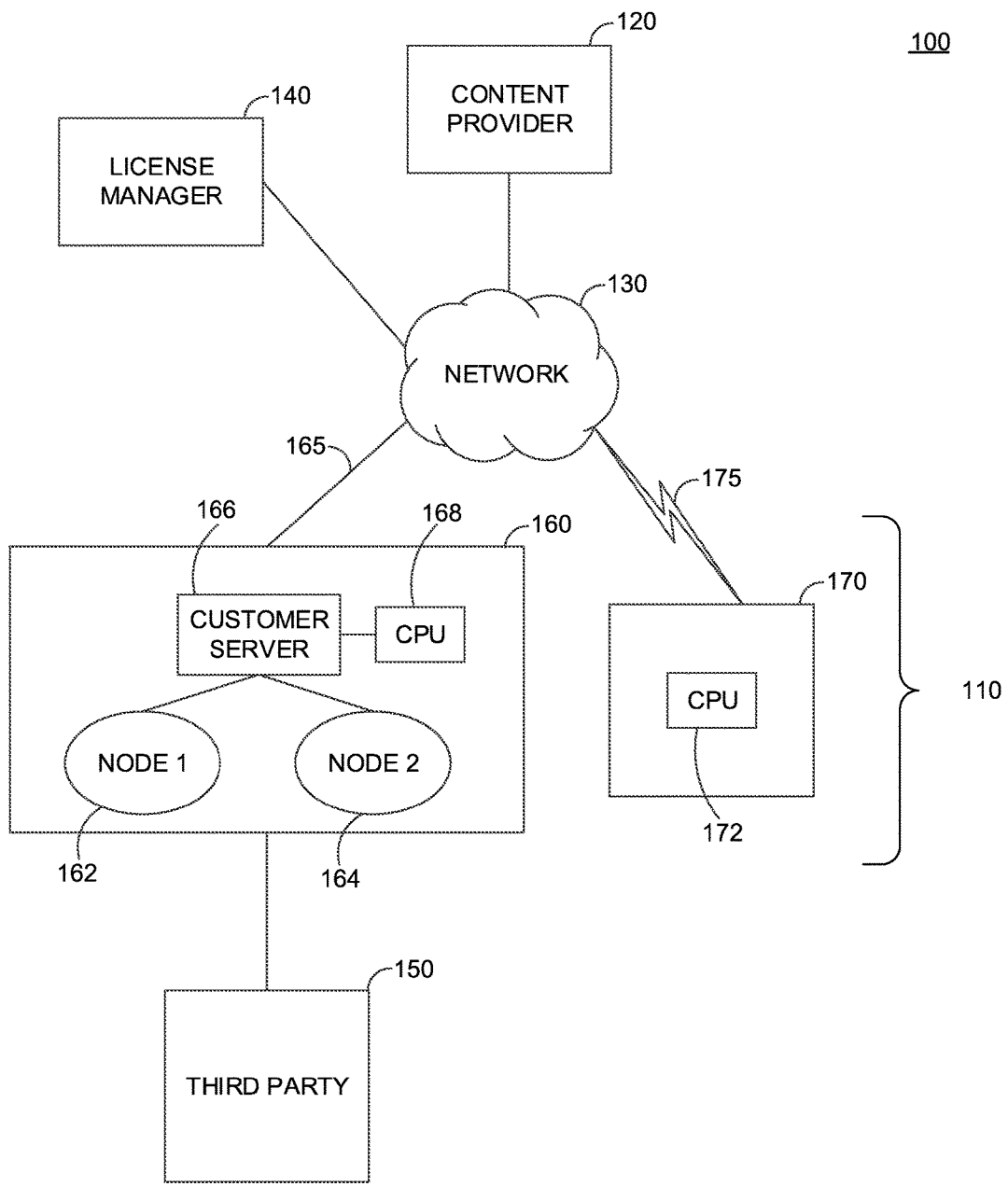
FIG. 1 is a diagram of an example of a communication system for unit-based licensing for third party access of digital content in accordance with embodiments of this disclosure.

A creator or owner of content, such as digital content or live-performance content, may control access to the content by licensing the content to end users. For example, licensing may include controlling the right to display, perform, distribute, or reproduce the content. Unit-based licensing may include licensing that controls access to content by allocating licensing units to a customer account, such that one or more licensing units may be redeemed or charged to access one or more digital content objects.

Unit-based licensing for third party access of digital content may include controlling access to content by one or more third parties via a customer system. For example, a third party device may send a request for access to content to the provider via a customer system and licensing units allocated to the customer system may be redeemed in exchange for access to the content by the third party.

The aspects, features, elements, and embodiments of methods, procedures, or algorithms disclosed herein, or any part or parts thereof, may be implemented in a computer program, software, or firmware incorporated in a non-transitory computer-readable storage medium for execution by a general purpose or special purpose computer or processor, and may be implemented as a computer program product, such as a computer program product accessible from a tangible computer-usable or computer-readable medium.

As used herein, the terminology "computer" or "device" includes any unit, or combination of units, capable of performing any method, or any portion or portions thereof, disclosed herein. Devices may further include mobile devices that may include user equipment, a wireless transmit/receive unit, a mobile station, a fixed or mobile subscriber unit, a pager, a cellular telephone, a personal digital assistant (PDA), a computer, or any other type of user device capable of operating in a mobile environment.

As used herein, the terminology "processor" includes a single processor or multiple processors, such as one or more general purpose processors, one or more special purpose processors, one or more conventional processors, one or more digital signal processors, one or more microprocessors, one or more controllers, one or more microcontrollers, one or more Application Specific Integrated Circuits (ASICs), one or more Application Specific Standard Products (ASSPs); one or more Field Programmable Gate Arrays (FPGAs) circuits, any other type or combination of integrated circuits (ICs), one or more state machines, or any combination thereof.

As used herein, the terminology "memory" includes any computer-usable or computer-readable medium or device that can, for example, tangibly contain, store, communicate, or transport any signal or information for use by or in connection with any processor. Examples of computer-readable storage mediums may include one or more read only memories, one or more random access memories, one or more registers, one or more cache memories, one or more semiconductor memory devices, one or more magnetic media, such as internal hard disks and removable disks, one or more magneto-optical media, one or more optical media such as CD-ROM disks, and digital versatile disks (DVDs), or any combination thereof.

As used herein, the terminology "example", "embodiment", "implementation", "aspect", "feature", or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein. As used herein, the terminology "cardinality" includes a number or count of elements or items in a set, group, plurality, or any other collection of zero or more elements.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terminology "digital content" may include computer software programs, video games, music, movies, videos, or any other media that may be embodied in digital form, and which may be accessed, downloaded, input, or otherwise transferred to a computer or processor. Digital content may include digital data or digital files that may be processed by external application programs or may be executed by external software, hardware, or both. As used herein, the terminology "content" may include live content or fixed content. Fixed content may include any content that may be presented from a tangible storage medium, such as digital content. Live content, or live-performance content, may include any content that may be accessed substantially concurrently with the creation or generation of the content, such as the presentation of a movie in a movie theater, a concert, a sporting event, a gallery display, or any other live event.

As used herein, the terminology "event" may include any presentation, distribution, or display of content capable of concurrent, or nearly concurrent, access by multiple users. For example, an event may include a physical presentation, such a presentation at a movie theater, concert hall, museum, or restaurant, or a virtual presentation, such as a broadcast over the Internet or a television broadcast. Although described as unit-based licensing for third party access of digital content, implementations of this disclosure may apply to unit-based licensing for third party content access.

As used herein, the terminology "access" or "accessing" may include presenting, downloading, executing, streaming, or otherwise interacting, or enabling interaction, with a content object. In some embodiments, digital content objects may be executed, stored, or both, at a provider location. In some embodiments, digital content objects may be stored locally on a customer network or customer device and the digital content objects may be executed or run on the customer network or device.

In some embodiments, a node based license may indicate that content is accessible by a unique device, such as a computer, a unique account, such as an account associated with an individual user, or a combination of a unique device and a unique account. In some embodiments, a network based license may indicate that content is accessible by one or more devices within a specified network. For example, a defined number of devices within the network may concurrently access the content. In some embodiments, a license, including a node based license or a network based license, may be associated with a unique content object, or with a suite of related content objects.

As used herein, the terminology "assigned units", "price", "licensing price" or variations thereof, may include an assigned number of licensing units that may be exchanged or redeemed to access a particular content object. As used herein, the terminology "licensed units" or "allocated units" may refer to a total number of units provided to a customer or customer group. As used herein, the terminology "checked out units", "redeemed units", or "exchanged units" may refer to assigned units charged to a customer for digital content being accessed. "Available units" may refer to a difference between licensed units and checked out units. In some embodiments, licensing units may be temporarily or permanently exchanged for access. Temporarily exchanged licensing units may be returned to the pool of available units associated with the customer upon termination or completion of content access.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

FIG. 1 is a diagram of an example of a communication system 100 for unit-based licensing for digital content access in accordance with embodiments of this disclosure. For simplicity, the communication system 100 shown in FIG. 1 includes a customer system 110, a provider 120, a network 130, a license manager 140, and a third party device 150; however, other elements, such as multiple networks, access points, or communication mediums may be included in a communication system for unit-based licensing for digital content access.

In some embodiments, customer system 110 may be associated with an individual user or customer, and the user may access content using licensing units allocated to the user. In some embodiments, customer system 110 may comprise devices and networks through which a customer or user may access digital content from provider 120. For example, as shown in FIG. 1, customer system 110 may include a customer network 160 and a customer device 170; however, any number of customer networks and customer devices may be used.

In some implementations, customer system 110 may be associated with a collection or group of customers, or members, and shared licensing units may be allocated to the group. For example, a group may include one or more families, a classroom of students, a small business, a social group, or any other organization capable of licensing content such that members of the group are capable of accessing the content.

In some embodiments, elements of the customer system 110, such as customer network 160 and customer device 170, may communicate with each other or with elements external to the customer system 110, such as the provider 120. For example, customer network 160 and customer device 170 may independently communicate through communication network 130.

In some embodiments, customer network 160 may include one or more individual nodes 162/164, a customer server 166, a host processor (CPU) 168, or any combination thereof. A node 162/164 may be a device, such as a computer, and may access digital content. For example, a node 162/164 may access digital content in response to user input. Although FIG. 1 includes a first node 162 and a second node 164 for simplicity, any number of nodes may be used. In some embodiments, a node 162/164 may be connected to a customer server 166 and may have a unique network address. In some embodiments, a node 162/164 may communicate with other nodes 162/164 within customer network 160. The customer server 166 may communicate with CPU 168. Although individual nodes 162/164 are depicted as being connected in a spoke configuration to the customer server 166, the individual nodes 162/164 may be connected in any other electronic computer network configuration. Although shown as separate units, in some embodiments, customer server 166 and CPU 168 may be combined into a single device.

In some embodiments, customer device 170 may be any device, such as a computer or mobile device, capable of accessing digital content. In some embodiments, a customer device 170 may include a processor, such as CPU 172.

In some embodiments, provider 120 may be a device or system configured to provide access to digital content to one or more licensed customers. For example, provider 120 may include an Internet Protocol (IP) network-based unit, such as a website service, that implements methods for controlling access to digital content. In some embodiments, provider 120 may provide customer system 110 access to digital content objects, which may be included in a suite of digital content. Although FIG. 1 shows the provider 120 as a single unit, the provider 120 may include any number of discrete units and any number of providers 120 may be used.

In some implementations, unit-based licensing for digital content may include communication between the customer system 110 and the provider 120 via the communication network 130. The communication network 130 may be a local area network (LAN), wide area network (WAN), virtual private network (VPN), a mobile or cellular telephone network, the Internet, or any other electronic communication medium. Although not explicitly shown in FIG. 1, each of the customer system 110, provider 120, and license manager 140 may communicate with communication network 130 through one or more Internet service providers (ISPs). In some embodiments, the customer network 160, the customer device 170, or both, may communicate with the network 130 via a wired connection 165 a wireless connection 175, or a combination of one or more wired or wireless connections.

In some embodiments, a license manager (LM) 140 may be included in the communication system 100. License manager 140 may control the access to digital content provided by provider 120. Although shown as a separate unit, in some embodiments, license manager 140 may be incorporated with provider 120, customer system 110, or both. In some embodiments, the license manager 140 may monitor content access for the customer system 110. For example, the license manager 140 may detect the termination or conclusion of access to content.

In some embodiments, license manager 140 may generate and maintain a log. The log may include a record of a number of available units that may be used by the customer system 110 at any given time. In some embodiments, the license manager 140 may update the log for each change of the available units for customer system 110. For example, the log may be updated to indicate a change in the available units in response to the accessing of digital content from provider 120, the termination of the access of digital content, or a change in pricing of digital content being accessed by the customer. In some embodiments, the log may be a file, or database, stored in a memory in communication with provider 120 or license manager 140.

In some embodiments, the communication system 100 may include a third party device 150, which may be a device, such as a computer or mobile device, capable of accessing digital content. Although not shown in FIG. 1, the third party device 150 may include a processor, a memory, or a combination thereof. In some embodiments, the third party device 150 may communicate with the content provider 120 via the customer system 110. For example, the customer network 160 may include a wireless network and the third party device 150 may communicate with the content provider 120 via a wireless network connection to the customer network 160. Although a single third party device 150 is shown in FIG. 1 for simplicity, any number of third party devices may be used.

In some embodiments, unit-based licensing for third party access of digital content may include controlling access to digital content in response to a request to access the digital content from a third party device via a customer system, or from an authorized device via a third party network.

Figure 2:
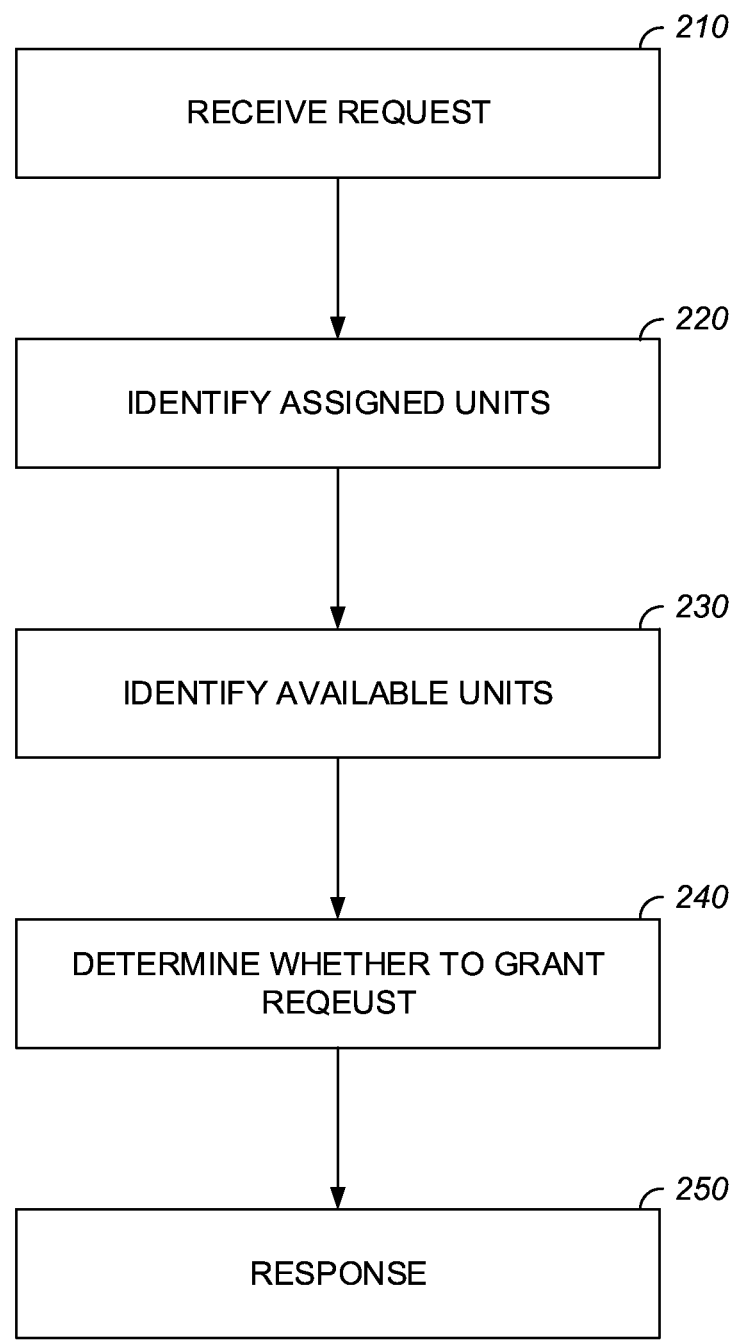
FIG. 2 is a flow diagram of an example of unit-based licensing for third party access of digital content in accordance with embodiments of this disclosure.

FIG. 2 is a flow diagram of an example of unit-based licensing for third party access of digital content in accordance with embodiments of this disclosure. Unit-based licensing for third party access of digital content may include temporarily or permanently exchanging licensing units for access to content, such as digital content. In some embodiments, unit-based licensing for third party access of digital content may be implemented in a communication system, such as the communication system 100 shown in FIG. 1.

In some embodiments, unit-based licensing for third party access of digital content may include receiving a request to access a digital content object at 210, identifying an amount of assigned units for the digital content object at 220, identifying an amount of available units 230, determining whether to grant the request at 240, responding to the request at 250, or a combination thereof.

In some embodiments, a request to access content may be received at 210. For example, a provider, such as the provider 120 shown in FIG. 1, may receive the request from a third party, such as the third party device 150 shown in FIG. 1, via a customer, such as the customer system 110 shown in FIG. 1. In another example, a provider, such as the provider 120 shown in FIG. 1, may receive the request from an authorized device via a third party network, such as the network 130 shown in FIG. 1. In some embodiments, an authorized device may be a customer device, such as the customer device 170 shown in FIG. 1, or a third party device, such as the third party device 150 shown in FIG. 1, that has been authorized to access content using licensing units allocated to the customer. Although the third party device 150 is shown in FIG. 1 as communicating via the customer system, the third party device may communicate via a third party network, such as the network 130 shown in FIG. 1.

In some embodiments, the request may indicate a selected digital content object. In some embodiments, the request to access content may include information identifying the customer, such as account information associated with the customer system, and may include information identifying the third party, such as an identifier of the third party device 150 shown in FIG. 1. For example, the customer system may include a network, such as a wireless network, and the third party device may connect to the network and may send a request to access content to the provider via the network of the customer system.

In some embodiments, assigned license units for the selected digital content may be identified at 220. In some embodiments, the number of assigned units for a digital content object may remain constant or may vary over time. In some embodiments, a license manager, such as the license manager 140 shown in FIG. 1, may identify the assigned license units for the selected digital content. In some embodiments, the license manager may be independent of the provider, and the license manager may receive the request via the customer system or via the provider.

In some embodiments, a number or cardinality of available units associated with the customer system may be determined at 230. The available units may indicate a number of licensing units that may be used by the customer system at a given time, such as at the time the request is received. For example, although not shown in FIG. 2, one or more licensing units may be allocated or licensed to the customer system, one or more of the allocated units may be temporarily or permanently exchanged or checked out for access to content, and the number of available units may indicate the difference between the number of allocated units and the number of checked out units.

In some embodiments, subgroups may be identified within the customer system and a portion of the available units associated with the customer system may be allocated to each respective subgroup. For example, the nodes 162/164 shown in FIG. 1 may be included in a first subgroup, the customer device 170 shown in FIG. 1 may be include in a second subgroup, and the third party device 150 shown in FIG. 1 may be included in a third subgroup.

In some embodiments, whether to grant access may be determined at 240. For example, determining whether to grant access at 240 may include determining whether the count of available units for the customer or the customer subgroup is equal to or greater than the number of assigned units for the digital content. In some embodiments, available units may be associated with the third party device independently of the customer system and determining whether to grant access at 240 may include determining whether the count of a combination of available units for the customer or the customer subgroup and available units for the third party device is equal to or greater than the number of assigned units for the digital content.

In some embodiments, a response may be output at 250. For example, the provider or licensing manager may generate a response indicating that the request for access is granted or denied and may transmit the response to the third party device, the customer system, or both.

In some embodiments, the request for access may be denied. For example, the number of available units associated with the customer or the customer subgroup may be less than the number of assigned units for the requested digital content and the request may be denied. In some embodiments, the provider may reject the request and may prevent the customer system, the third party device, or both, from accessing to the content.

In some embodiments, the request for access may be granted. For example, the number of available units associated with the customer or the customer subgroup may be equal to or greater than the number of assigned units for the requested digital content and the request may be granted.

Although not shown separately, in some embodiments, granting the request may include charging, redeeming, or exchanging a number of available licensing units allocated to the customer system or the customer subgroup corresponding to the number of assigned units for the digital content object. For example, the license manager or provider may record the number of licensing units charged, may update the number available units associated with the customer system or the customer subgroup, or both. In some embodiments, the license manager or provider may record any change in charged units or available units in a log. In some embodiments, the number of available units for the customer system or the customer subgroup may be decreased in an amount equal to the number of assigned units for the digital content indicated in the request.

In some embodiments, granting the request may include determining whether to charge one or more of the available licensing units allocated to the customer system or the customer subgroup. For example, the provider or the licensing manager may determine the number of checked out units currently charged against the customer system or the customer subgroup, and may determine a number of licensing units to charge against the customer system or the customer subgroup based on a difference between the number of assigned units for the requested content and the number of currently checked out units for the customer or the customer subgroup. For example, the number of currently checked out units for the customer or the customer subgroup may be greater than the number of assigned units and granting the request may omit checking out available units. In another example, the number of currently checked out units for the customer or the customer subgroup may be less than the number of assigned units and granting the request may include checking out a number of available units equal to the difference between the number of assigned units and the number of currently checked out units.

Although not shown separately, in some embodiments, the third party device may access the digital content in response to receiving a response granting the request. For example, the third party device may receive the requested content from the provider via the customer system. In some embodiments, the available units for the customer or the customer subgroup may be updated in response to the third party device accessing the content.

Although not shown separately, in some embodiments, the number of charged units may be returned to the customer system or the customer subgroup upon completion or termination of the access of the digital content.

Figure 3:
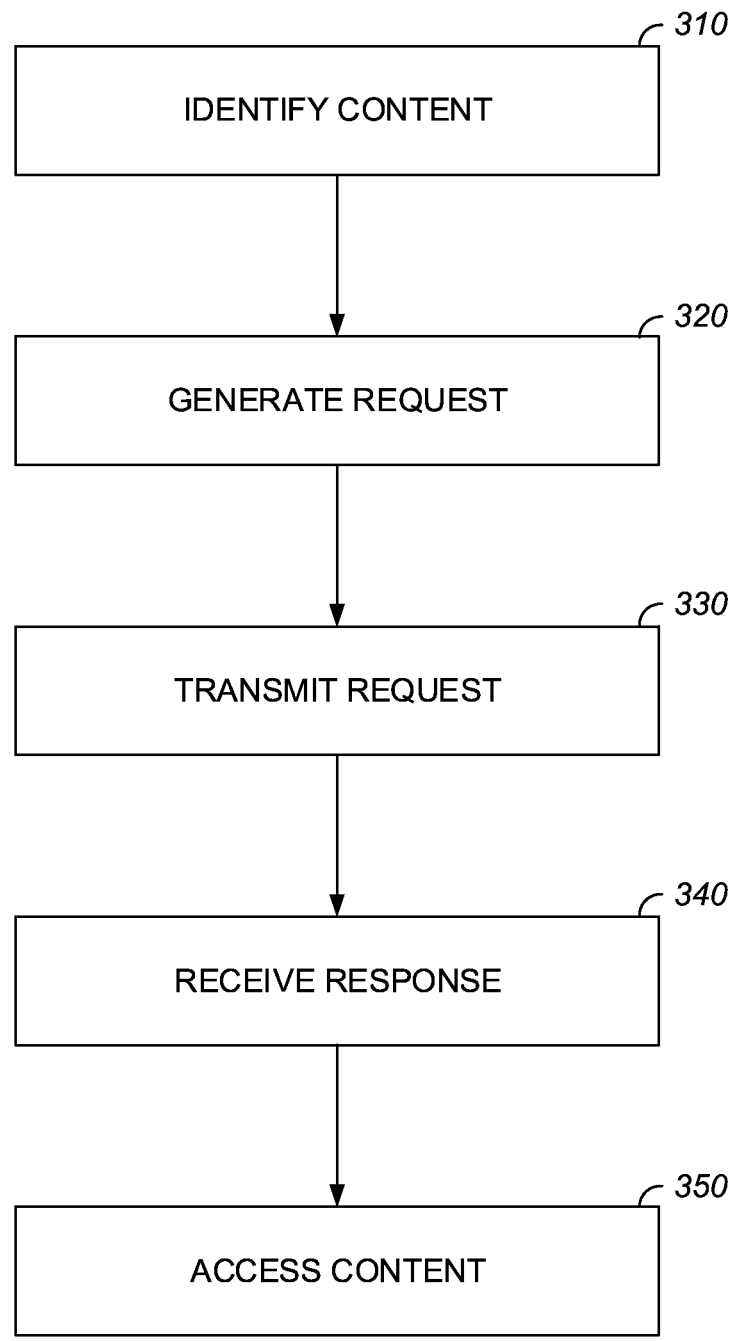
FIG. 3 is a flow diagram of an example of accessing digital content using unit-based licensing by a third party in accordance with embodiments of this disclosure.

FIG. 3 is a flow diagram of an example of accessing digital content using unit-based licensing by a third party in accordance with embodiments of this disclosure. Accessing digital content using unit-based licensing by a third party may include temporarily or permanently exchanging licensing units for access to content, such as digital content. In some embodiments, accessing digital content using unit-based licensing by a third party may be implemented in a communication system, such as the communication system 100 shown in FIG. 1.

In some embodiments, accessing digital content using unit-based licensing by a third party may include identifying a digital content object at 310, generating a request to access the digital content object at 320, transmitting the request to access the digital content object at 330, receiving a response to the request at 340, accessing the digital content object at 350, or a combination thereof.

In some embodiments, a digital content object may be identified at 310. For example, identifying the digital content object may include identifying a computer software program, video game, music, a movie, a video, or any other media that may be embodied in digital form, and may be accessed, downloaded, input, or otherwise transferred to a computer or processor. In some embodiments, identifying a digital content object may include identifying a plurality of digital content objects.

In some embodiments, a request to access the identified digital content object may be generated at 320. In some embodiments, the request may indicate the digital content object identified at 310. In some embodiments, the request to access content may include information identifying the customer, such as account information associated with the customer system, and may include information identifying the third party, such as an identifier of the third party device 150 shown in FIG. 1. For example, the customer system may include a network, such as a wireless network, and the third party device may connect to the network and may send a request to access content to the provider via the network of the customer system.

In some embodiments, a request to access the identified digital content object may be transmitted at 330. For example, a third party, such as the third party device 150 shown in FIG. 1, may transmit the request to a provider, such as the provider 120 shown in FIG. 1, via a customer, such as the customer system 110 shown in FIG. 1. In another example, an authorized device may transmit the request to a provider, such as the provider 120 shown in FIG. 1, via a third party network, such as the network 130 shown in FIG. 1. In some embodiments, an authorized device may be a customer device, such as the customer device 170 shown in FIG. 1, or a third party device, such as the third party device 150 shown in FIG. 1, that has been authorized to access content using licensing units allocated to the customer. Although the third party device 150 is shown in FIG. 1 as communicating via the customer system, the third party device may communicate via a third party network, such as the network 130 shown in FIG. 1.

In some embodiments, a response to the request may be received at 340. For example, the provider or licensing manager may generate a response indicating that the request for access is granted or denied and may transmit the response to the third party device, the customer system, or both.

In some embodiments, the response may indicate whether the request is granted or denied. In some embodiments, whether the request is granted or denied may depend on a count or cardinality of assigned license units for the selected digital content. In some embodiments, the number of assigned units for a digital content object may remain constant or may vary over time. In some embodiments, a license manager, such as the license manager 140 shown in FIG. 1, may identify the assigned license units for the selected digital content. In some embodiments, the license manager may be independent of the provider, and the license manager may receive the request via the customer system or via the provider.

In some embodiments, whether the request is granted or denied may depend on a count or cardinality of available licensing units associated with the customer system. The available units may indicate a number of licensing units that may be used by the customer system at a given time, such as at the time the request is received. For example, although not shown in FIG. 2, one or more licensing units may be allocated or licensed to the customer system, one or more of the allocated units may be temporarily or permanently exchanged or checked out for access to content, and the number of available units may indicate the difference between the number of allocated units and the number of checked out units.

In some embodiments, subgroups may be identified within the customer system and a portion of the available units associated with the customer system may be allocated to each respective subgroup. For example, the nodes 162/164 shown in FIG. 1 may be included in a first subgroup, the customer device 170 shown in FIG. 1 may be include in a second subgroup, and the third party device 150 shown in FIG. 1 may be included in a third subgroup.

In some embodiments, whether the request is granted or denied may be based on whether the count, or cardinality, of available units for the customer or the customer subgroup is equal to or greater than the number, or cardinality, of assigned units for the digital content, which may indicated that the cardinality of assigned units for the digital content is within, such as equal to or less than, the cardinality of available units for the customer or the customer subgroup or may indicate that the cardinality of assigned units for the digital content exceeds the cardinality of available units for the customer or the customer subgroup. In some embodiments, available units may be associated with the third party device independently of the customer system and whether the request is granted or denied may depend on whether the count of a combination of available units for the customer or the customer subgroup and available units for the third party device is equal to or greater than the number of assigned units for the digital content.

In some embodiments, the request for access may be denied. For example, the number of available units associated with the customer or the customer subgroup may be less than the number of assigned units for the requested digital content and the request may be denied. In some embodiments, the provider may reject the request and may prevent the customer system, the third party device, or both, from accessing to the content.

In some embodiments, the request for access may be granted. For example, the number of available units associated with the customer or the customer subgroup may be equal to or greater than the number of assigned units for the requested digital content and the request may be granted.

Although not shown separately, in some embodiments, granting the request may include charging, redeeming, or exchanging a number of available licensing units allocated to the customer system or the customer subgroup corresponding to the number of assigned units for the digital content object. For example, the license manager or provider may record the number of licensing units charged, may update the number available units associated with the customer system or the customer subgroup, or both. In some embodiments, the license manager or provider may record any change in charged units or available units in a log. In some embodiments, the number of available units for the customer system or the customer subgroup may be decreased in an amount equal to the number of assigned units for the digital content indicated in the request.

In some embodiments, granting the request may include determining whether to charge one or more of the available licensing units allocated to the customer system or the customer subgroup. For example, the provider or the licensing manager may determine the number of checked out units currently charged against the customer system or the customer subgroup, and may determine a number of licensing units to charge against the customer system or the customer subgroup based on a difference between the number of assigned units for the requested content and the number of currently checked out units for the customer or the customer subgroup. For example, the number of currently checked out units for the customer or the customer subgroup may be greater than the number of assigned units and granting the request may omit checking out available units. In another example, the number of currently checked out units for the customer or the customer subgroup may be less than the number of assigned units and granting the request may include checking out a number of available units equal to the difference between the number of assigned units and the number of currently checked out units.

In some embodiments, the third party device may access the digital content in response to receiving a response granting the request at 350. For example, the third party device may receive the requested content from the provider via the customer system. In some embodiments, the available units for the customer or the customer subgroup may be updated in response to the third party device accessing the content.

Although not shown separately, in some embodiments, the number of charged units may be returned to the customer system or the customer subgroup upon completion or termination of the access of the digital content.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method comprising:
   receiving, at a first computer system from a second computer system via a communications network, an electronic communication including a request for access to content by a third computer system, the request for access comprising:
      a first identifier indicating information identifying an account associated with the second computer system, and
      a second identifier indicating the third computer system;
   in response to receiving the request:
      identifying, by the first computer system, the account associated with the second computer based on the first identifier,
      identifying, by the first computer system, the third computer system based on the second identifier,
      identifying, by the first computer system, a cardinality of assigned licensing units for the content, wherein the cardinality of assigned licensing units is a number of licensing units that may be exchanged or redeemed to access the content,
      identifying, by the first computer system, a cardinality of available licensing units allocated to the account associated with the second computer system,
      identifying, by the first computer system, a cardinality of additional available licensing units allocated the third computer system,
      determining, by the first computer system, a sum of the available licensing units allocated to the account associated with the second computer system and the additional available licensing units allocated to the third computer system,
      determining, by the first computer system, that the sum is greater than or equal to the cardinality of the assigned licensing units, and
      in response to determining that the sum is greater than or equal to the cardinality to the assigned licensing units:
         outputting a response from the first computer system to the second computer system and the third computer system via the communications network, wherein the response includes an indication that the request is granted with respect to the third computer system,
         providing, by the first computer system, access to the content to the third computer system via the second computer system, and
         transmitting the content to the third computer system via the communications network.

2. The method of claim 1, wherein the account is associated with a plurality of subgroups, and wherein one or more users are associated with a first subgroup of the plurality of subgroups.

3. An apparatus comprising:
   a first computer system comprising:
      a non-transitory computer readable memory; and
      a processor configured to execute instructions stored on the memory to:
         receive, at a first computer system from a second computer system via a communications network, an electronic communication including a request for access to content by a third computer system, the request for access comprising:
            a first identifier indicating an account associated with the second computer system, and a second identifier indicating the third computer system;

in response to the request:
  identify, by the first computer system, the account associated with the second computer based on the first identifier,
  identify, by the first computer system, the third computer system based on the second identifier,
  identify, by the first computer system, a cardinality of assigned licensing units for the content, wherein the cardinality of assigned licensing units is a number of licensing units that may be exchanged or redeemed to access the content,
  identify, by the first computer system, a cardinality of available licensing units allocated to the account associated with the second computer,
  identify, by the first computer system, a cardinality of additional available licensing units allocated the third computer system,
  determine, by the first computer system, a sum of the available licensing units allocated to the account associated with the second computer and the additional available licensing units allocated to the third computer system,
  determine, by the first computer system, whether the sum is greater than or equal to the cardinality of the assigned licensing units, and
  in response to determining that the sum is greater than or equal to the cardinality to the assigned licensing units:
    output a response from the first computer system to the second computer system and the third computer system via the communications network, wherein the response includes an indication that the request is granted with respect to the third computer system,
    provide, by the first computer system, access to the content to the third computer system via the second computer system, and
    transmit the content to the third computer system via the communications network.

4. The apparatus of claim 3, wherein the account is associated with a plurality of subgroups, and wherein one or more users are associated with a first subgroup of the plurality of subgroups.

\* \* \* \* \*

UNITED STATES PATENT AND TRADEMARK OFFICE
CERTIFICATE OF CORRECTION

PATENT NO. : 10,679,151 B2
APPLICATION NO. : 14/448001
DATED : June 9, 2020
INVENTOR(S) : Srikanth Mahalingam and Stephanie Scapa It is certified that error appears in the above-identified patent and that said Letters Patent is hereby corrected as shown below:

In the Claims

Column 12, Line 8:
Claim 1, after "indicating" delete "information identifying"

Signed and Sealed this
Eleventh Day of August, 2020

Andrei Iancu
*Director of the United States Patent and Trademark Office*